United States Patent
Lazaridis (10) Patent No.: US 8,260,293 B2
(45) Date of Patent: *Sep. 4, 2012

(54) DEVICES AND METHODS FOR PLACING A CALL ON A SELECTED COMMUNICATION LINE

(75) Inventor: Mihal Lazaridis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/232,042

(22) Filed: Sep. 14, 2011

(65) Prior Publication Data

US 2012/0003968 A1   Jan. 5, 2012

Related U.S. Application Data

(63) Continuation of application No. 12/015,309, filed on Jan. 16, 2008, now Pat. No. 8,032,138.

(51) Int. Cl.
*H04W 4/00* (2009.01)

(52) U.S. Cl. .................. 455/434; 455/450

(58) Field of Classification Search .......... None
See application file for complete search history.

(56) References Cited

U.S. PATENT DOCUMENTS

| 5,367,558 | A | 11/1994 | Gillig et al. |
| 5,526,403 | A | 6/1996 | Tam et al. |
| 6,016,336 | A | 1/2000 | Hanson |
| 6,154,660 | A | 11/2000 | Singh |
| 7,715,535 | B2 | 5/2010 | Vander Veen et al. |
| 8,032,138 | B2 * | 10/2011 | Lazaridis ............ 455/434 |
| 2002/0042288 | A1 | 4/2002 | Nakayama |
| 2005/0125235 | A1 | 6/2005 | Lazay et al. |
| 2005/0170854 | A1 | 8/2005 | Benco et al. |
| 2007/0047695 | A1 | 3/2007 | Tal et al. |
| 2007/0081641 | A1 | 4/2007 | Veen et al. |
| 2010/0159901 | A1 | 6/2010 | Vander Veen et al. |

FOREIGN PATENT DOCUMENTS

| EP | 1768360 | 3/2007 |
| EP | 2086210 | 8/2009 |
| EP | 2317738 | 5/2011 |
| WO | 00/05862 | 2/2000 |
| WO | 2005027475 | 3/2005 |

OTHER PUBLICATIONS

Communication under rule 71(3) EPC. European Patent Application No. 08150304.7. Dated: Apr. 21, 2011.
Nextel Alternate Line Service FAQs prior to Feb. 9, 2005.
Co-pending U.S. Appl. No. 12/718,070, "Method and Apparatus for Line Selection in a Communication Device", filed Mar. 5, 2010.
Extended European Search Report (EESR). European Patent Application No. 11155865.6. Dated: Apr. 5, 2011.
European Examination Report. European Patent Application No. 08150304.7. Dated: Mar. 2, 2009.
European Search and Examination Report. European Patent Application No. 08150304.7. Dated: Aug. 6, 2008.

(Continued)

*Primary Examiner* — Erika Gary (74) *Attorney, Agent, or Firm* — Bereskin & Parr LLP/S.E.N.C.R.L., s.r.l.

(57) ABSTRACT

Devices and methods for placing a call from a mobile device on one of a plurality of communication lines accessible at the mobile device are disclosed herein.

15 Claims, 5 Drawing Sheets

OTHER PUBLICATIONS

Co-pending U.S. Appl. No. 11/235,509, "Method and Apparatus for Line Selection in a Communication Devices", Filed: Sep. 27, 2005.

3CX "Manual: 3CX Phone System for Windows", Version 3.1. Jun. 15, 2007 Retrieved from Internet: htt;//www.3cx.com/manual/3CXPhoneSystemManual31.pdf.

Communication pursuant to Rule 70(2) and 70a(2) EPC and Reference to Rule 39(1) EPC. European Patent Application No. 11155865.6. Dated: May 10, 2011.

Office Action. Canadian Patent Application No. 2,647,301. Dated: Jun. 20, 2011.

Response. European Application No. 08150304.7. Dated: Sep. 8, 2008.

Response. European Application No. 08150304.7. Dated: Sep. 1, 2009.

Decision to grant a European patent pursuant to Article 97(1) EPC. European Application No. 08150304.7. Dated: Sep. 29, 2011.

Response. European Application No. 11155865.6. Dated: Jun. 17, 2011.

Office Action. Co-pending U.S. Appl. No. 12/718,070. Dated: Oct. 28, 2011.

Amendment. Co-pending U.S. Appl. No. 12/718,070. Dated: Mar. 27, 2012.

Final Office Action. Co-pending U.S. Appl. No. 12/718,070. Dated: Jun. 15, 2012.

* cited by examiner

DEVICES AND METHODS FOR PLACING A CALL ON A SELECTED COMMUNICATION LINE

CROSS REFERENCE TO RELATED APPLICATION

This application is a continuation of prior U.S. patent application Ser. No. 12/015,309, filed on Jan. 16, 2008, and issued as U.S. Pat. No. 8,032,138, the entirety of which is hereby incorporated by reference.

TECHNICAL FIELD

Embodiments described herein relate generally to mobile devices, and more specifically to mobile devices that allow outgoing calls to be made by a user on a communication line selected from a plurality of communication lines.

BACKGROUND

Many modern mobile devices are multi-functional. They may be configured to allow users to engage in both electronic mail ("e-mail") communications and telephone communications, for example. Additionally, it is common for a user to utilize a mobile device for different purposes. For example, a user may operate a single mobile device to engage in communications relating to both business and personal uses.

Phone-equipped mobile devices may be adapted to accommodate an Alternate Line Service (ALS) or similar service. With respect to these mobile devices, two (or more) phone numbers may be associated with a mobile device, with each phone number being associated with a different communication line. A user may wish to place an outgoing call on a specific communication line so that when the call is received by a receiving party, the phone number associated with that communication line will be identified on the receiving party's phone where "call display" functionality has been enabled on that phone. Use of multiple communication lines may also be useful for line-specific tracking purposes (e.g. to facilitate separate billing for long distance calls relating to business and personal uses).

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Embodiments described herein are generally directed to devices and methods for placing a call on a selected one of a plurality of communication lines.

In a broad aspect, there is provided a method of placing a call from a mobile device on one of a plurality of communication lines accessible at the mobile device, the method comprising the acts of: detecting when a call is initiated at the mobile device based on input received via a user interface of the mobile device; outputting an audio prompt requesting a line selection after detecting that the call has been initiated at the mobile device; receiving user input identifying the line selection in response to the audio prompt; identifying a selected one of the plurality of communication lines accessible at the mobile device from the user input; and operating a communication module to place the call on the selected communication line.

In another broad aspect, there is provided a mobile device configured to place a call on one of a plurality of communication lines accessible at the mobile device, the mobile device comprising a processor, a memory, at least one input device and at least one output device, wherein the mobile device provides a user interface, and wherein the mobile device further comprises: a call initiation detection module configured to detect when a call is initiated at the mobile device based on input received via the user interface of the mobile device; an audio prompt module configured to output an audio prompt requesting a line selection after the call initiation detection module detects that the call has been initiated at the mobile device; a line selection input module configured to receive user input identifying the line selection in response to the audio prompt; a line selection module configured to identify a selected one of the plurality of communication lines accessible at the mobile device from the user input; and a communication module configured to place the call on the selected communication line.

These and other aspects and features of various embodiments will be described in greater detail below.

Some embodiments described herein make use of a mobile station. A mobile station generally comprises a two-way communication device with advanced data communication capabilities having the capability to communicate with other devices, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device may communicate with other devices through a network of transceiver stations.

Figure 1:
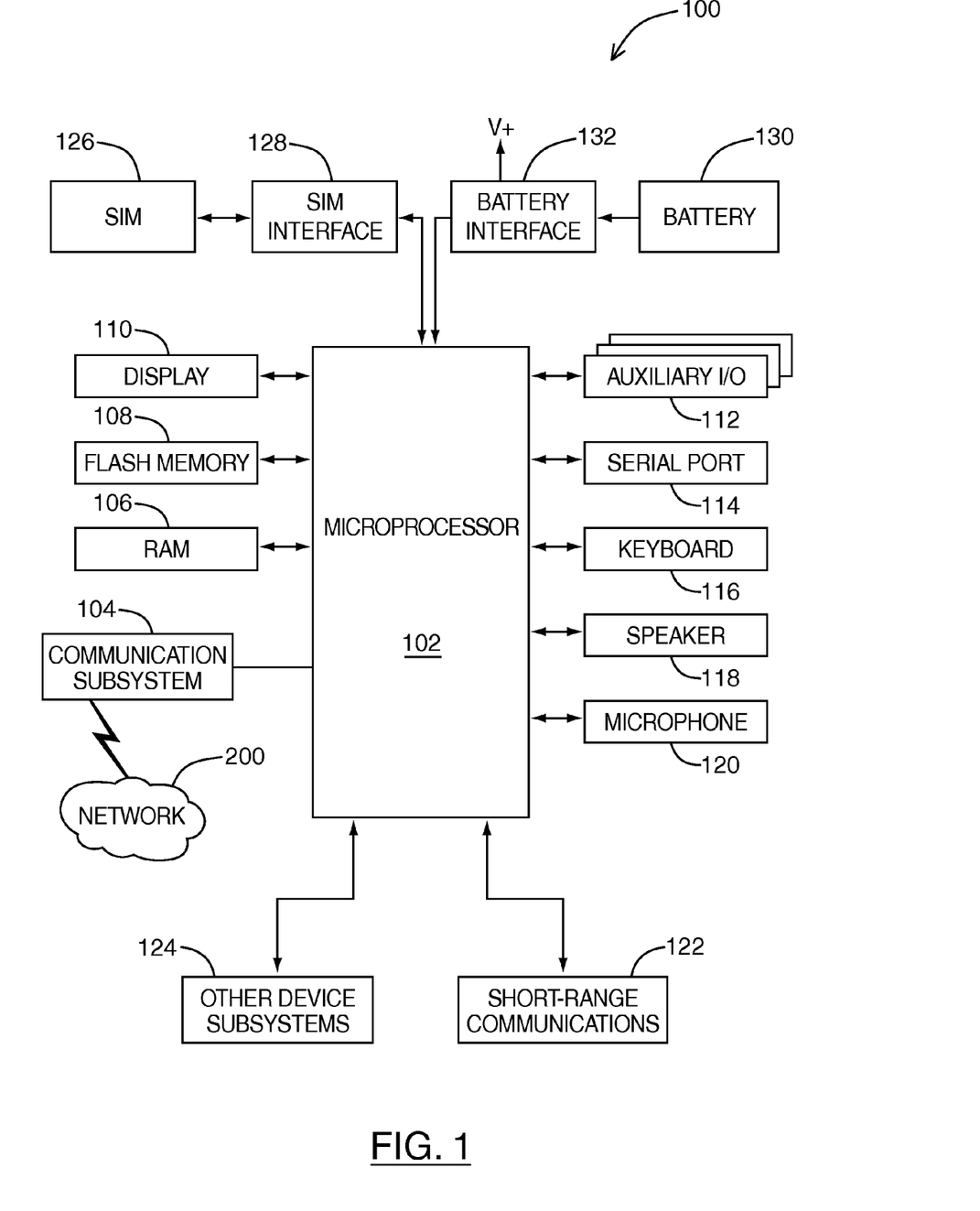
FIG. 1 is a block diagram of a mobile device in one example implementation.
Figure 2:
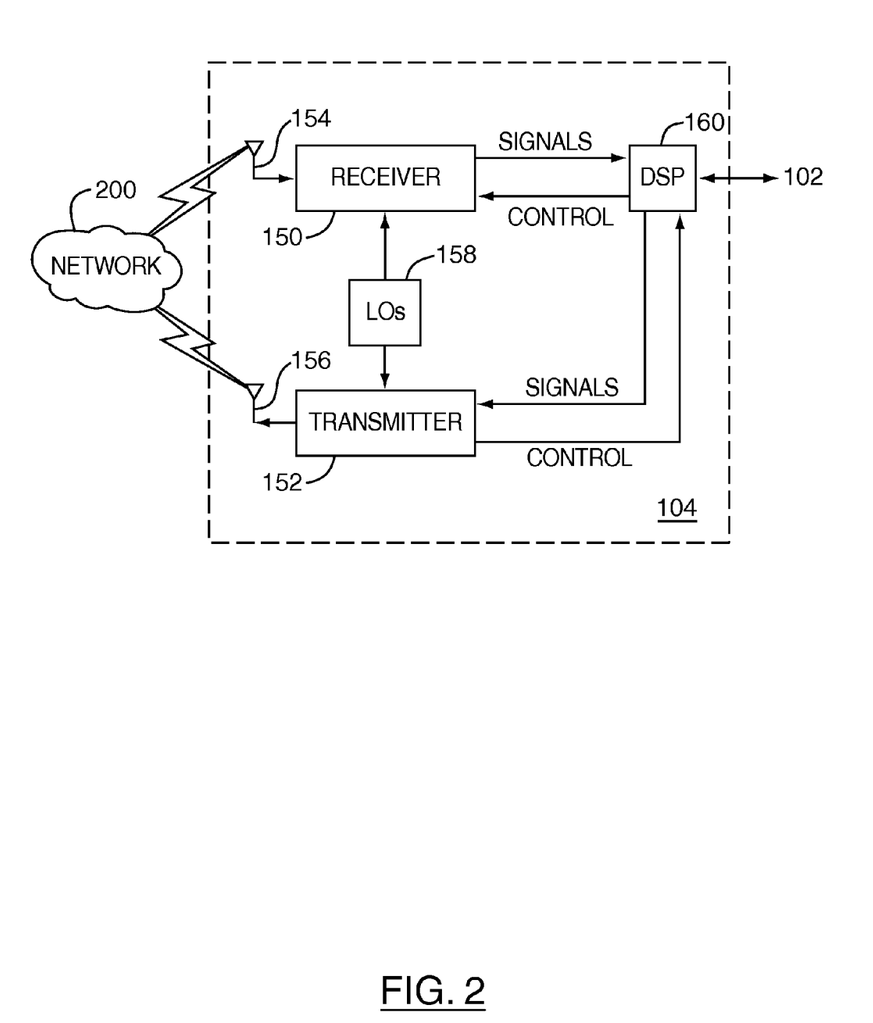
FIG. 2 is a block diagram of a communication subsystem component of the mobile device of FIG. 1.
Figure 3:
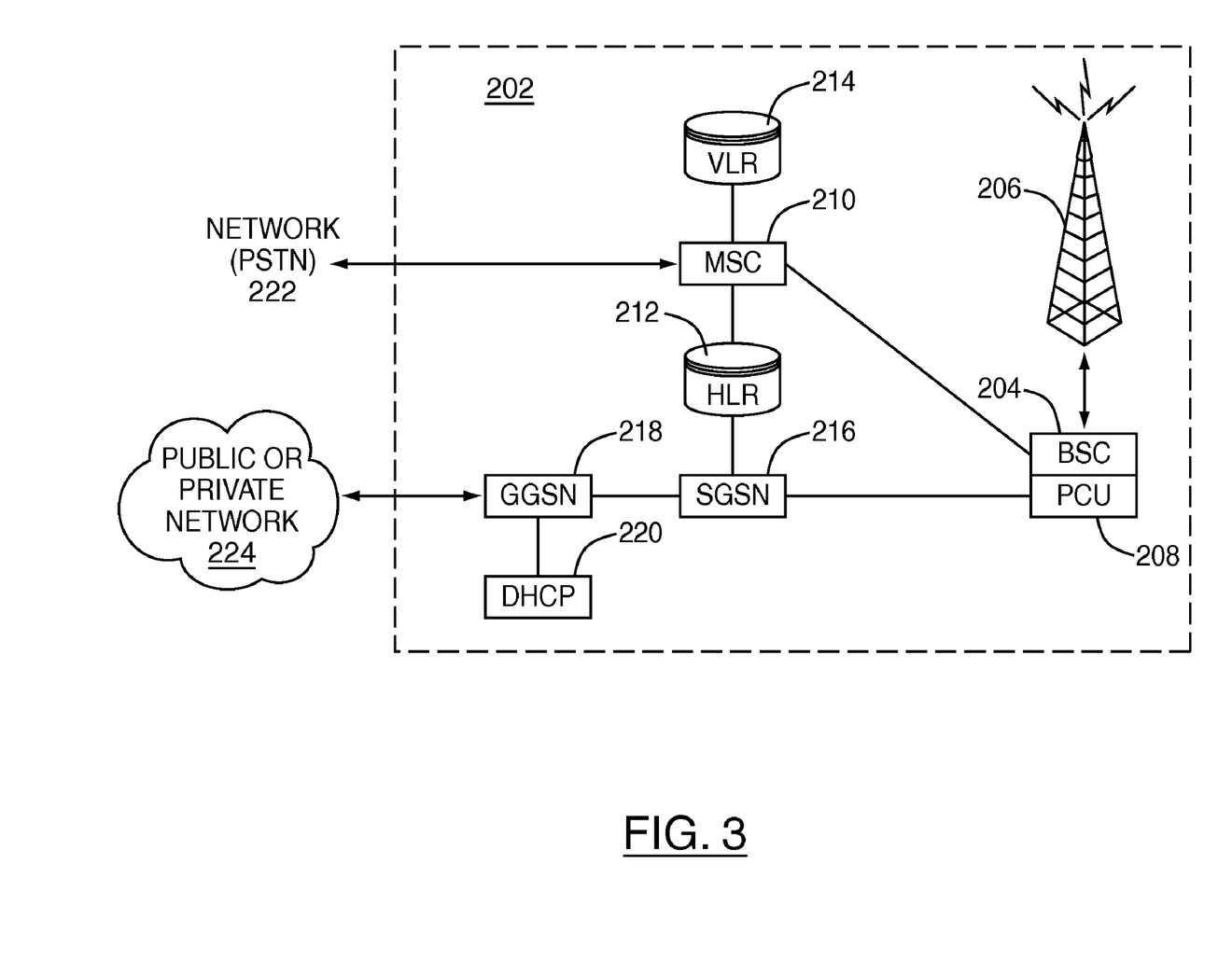
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded by Enhanced Data GSM Environment (EDGE), Universal Mobile Telecommunications Service (UMTS), and Ultra Mobile Broadband (UMB), etc. New standards are still being defined, but it is believed that they will have similarities to the network behaviour described herein, and it will also be understood by persons skilled in the art that the embodiments of the present disclosure are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 may provide for a Subscriber Identity Module ("SIM") card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services may include without limitation: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 may be a battery-powered device and may include a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide the power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family (Wi-Fi®) of standards developed by IEEE.

In use, a received signal such as a text message, an e-mail message, or web page download is processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad. A composed item may be transmitted over network 200 through communication subsystem 104.

For voice communications, the overall operation of mobile device 100 is substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (ND) conversion. ND conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 performs a "GPRS Attach" to acquire an IP address and to access data services. This normally is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be de-allocated and the IP address returned to the IP address pool managed by DHCP server 220.

Figure 4:
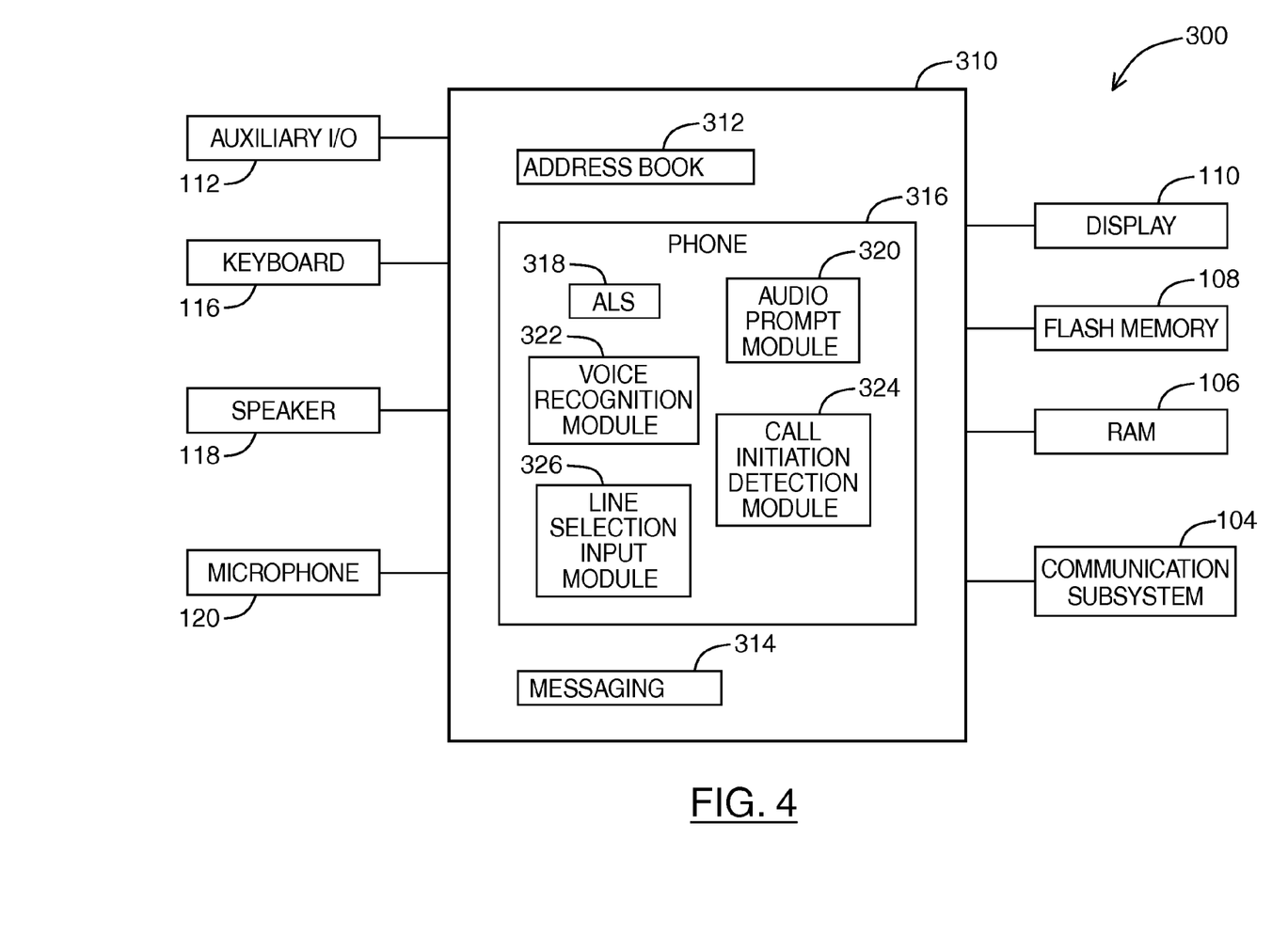
FIG. 4 is a block diagram illustrating further aspects of the mobile device of FIG. 1.

Referring now to FIG. 4, a block diagram illustrating further aspects of mobile device 100 of FIG. 1 is shown generally as 300. As noted earlier with reference to FIG. 1, microprocessor 102, in addition to its operating system functions, enables execution of software applications on mobile device 100. A set of applications that control basic device operations, including data and voice communication applications, may be installed on mobile device 100 during its manufacture. Operating system software and other software applications are typically stored in a persistent store (e.g. flash memory 106) or other store on mobile device 100, or on a device coupled thereto. It will be understood that the operating system, software applications or parts thereof, may be temporarily loaded in a volatile store such as RAM 106. Other instructions and/or data received by the mobile device 100 and subject to processing may also be temporarily stored in RAM 106.

Software applications that are loaded or stored on mobile device 100 may be implemented as functional components or modules 310. Modules 310 interact with various components of mobile device 100. For instance, as shown by way of example in FIG. 4, modules 310 may interact with communication subsystem 104, RAM 106, flash memory 108, display 110, auxiliary I/O device(s) 112, keyboard 116, speaker 118, and microphone 120. Other auxiliary I/O device(s) 112 may comprise, for example, a headset and/or an earpiece (not shown), each of which may be a wired or wireless device.

Modules 310 may comprise, for example, an address book module 312, a messaging module 314 (e.g. for e-mail and/or SMS or MMS messaging), a phone application module 316, an alternate line service (ALS) module 318, an audio prompt module 320, a voice recognition module 322, a call initiation module 324, and a line selection input module 326. While modules 310 may also comprise a communication module (not explicitly shown in FIG. 4) configured to place calls on any one (or more) of a plurality of communication lines accessible at the mobile device 100, one or more communication modules may also reside in communication subsystem 104. The functionality of the modules described herein is provided by way of example only. Persons skilled in the art will understand that some or all of the functionality of one or more of the modules described herein may be provided by other modules, and in various combinations, in variant embodiments.

Address book module 312 is generally configured to allow contact information (e.g. individual contact and company names, telephone numbers, messaging addresses, and other information) to be stored and managed. Messaging module 314 facilitates the sending and receiving of electronic messages over a wireless network 200 and/or other network.

Phone application module 316 is generally configured to facilitate voice communication between the user and other parties, including the placement of outgoing calls by the user and the reception of incoming calls on the mobile device 100.

Calls may be placed and received on a communication line specifically configured for voice communications. In certain embodiments, calls may alternatively or additionally be placed and received on other types of communication lines, including a communication line generally configured for data communications, or a communication line configured for both voice and data communications, for example. For example, mobile device 100 may be configured to provide Voice over IP (VoIP), Enterprise Voice, and/or video phone functionality.

Embodiments described herein are generally applicable to mobile devices that provide access to multiple (i.e. two or more) communication lines on which outgoing calls may be placed, as initiated by a mobile device user. Typically, these mobile devices will also be configured to allow incoming calls to be received by the user over the same communication lines.

In example embodiments, each of the multiple communication lines has a different telephone number associated therewith. For example, a user may have a business phone number and a different personal phone number. When a user places an outgoing call on a specific communication line, the phone number associated with that communication line may be identified on a receiving party's phone that is equipped with "call display" functionality.

Referring again to FIG. 4, the ALS module 318 is provided to facilitate selection of the communication line to be used by phone application module 316 for placing an outgoing call from a mobile device (e.g. mobile device 100 of FIG. 1), for example. ALS module 318 is also referred to herein as a line selection module. The line selection module 318 is configured to identify a selected communication line to be used by phone application module 316 on which an outgoing call on the mobile device 100 may be placed, based upon line selection data stored on mobile device 100 (e.g. configuration settings that define a default communication line), and/or based upon input received by the user. It will be understood that some or all of the functionality of line selection module 318 may be provided or otherwise integrated with phone application module 316 or with a different module on mobile device 100.

In accordance with at least one embodiment, call initiation detection module 324 is configured to detect when a call has been initiated by a mobile device user based on input received via a user interface of the mobile device 100. The user interface may be coupled to one or more input devices, such as a keypad or keyboard 116. For example, the call initiation detection module 324 may be configured to detect when the user has entered a phone number in a phone application or a key associated with a phone number, and when the user has subsequently pressed a "send" key on mobile device 100 or provided other similar input (e.g. selecting a "call contact" item or similar "call" option from a menu) to initiate a call from mobile device 100.

After the call initiation detection module 324 detects that the user of mobile device has initiated a call, audio prompt module 320 is activated. Audio prompt module 320 is configured to output an audio prompt requesting that the user select a communication line that is accessible at mobile device 100 for use in placing the outgoing call. In one embodiment, the audio prompt may be output over speaker 118 of mobile device 100. In variant embodiments, the audio prompt may be output over another output device 112, such as an earpiece or a headset, for example.

In at least one embodiment, the user may be permitted to select the particular audio prompt to be used for line selection requests when configuring mobile device 100.

In at least one embodiment, the audio prompt may be some type of audio signal (e.g. one or more beeps, one or more musical tones) that the user of mobile device 100 may uniquely recognize as a request for a line selection. The specific type of audio signal to be employed may be configurable by a user. In one example embodiment, an audio prompt may be combined with a visual prompt on display 110. In such embodiments, the audio prompt may alert the user that a line selection is required, and the visual prompt on display 110 may also explain that a line selection is required.

In at least one other embodiment, the audio prompt may be a voice prompt, which indicates that a line selection is required. For example, the voice prompt may be a recorded, synthesized or simulated voice. The voice prompt may ask the user to identify a communication line for the outgoing call (e.g. "Which line would you wish to use for this call?"). The voice prompt may also ask the user to enter a line number (e.g. 1, 2) or to enter some other line identifier (e.g. business, personal).

The use of voice prompts and audio prompts more generally as described herein, may be useful in situations where a user of mobile device 100 is unfamiliar with the ALS functionality provided by his mobile device 100. For example, the user may be unaware that multiple communication lines are accessible at his mobile device 100 and that a line selection may need to be made in order to place an outgoing call. The use of voice prompts, and audio prompts more generally, may be a particularly convenient way to inform the user that a line selection is required. It is likely that the user will have just placed his ear to speaker 118 (or earpiece or headset) shortly after the user has initiated the call (e.g. by pressing a "send" key or selecting a "call" option).

In the example embodiments described herein, the audio prompt module 320 is executed by processor 102 and resides on mobile device 100. It will be understood that some or all of the functionality of audio prompt module 320 may be provided or otherwise integrated with phone application module 316 or with a different module on mobile device 100.

After the audio prompt is output by audio prompt module 320, line selection input module 326 receives input from the user identifying a line selection in response to the audio prompt. In one embodiment, the user may respond to the audio prompt, which may be a voice prompt or other audio prompt for example, through keyed input by pressing a key on a keypad such as keyboard 116. The audio prompt output by audio prompt module 320 may have provided an appropriate instruction to the user (e.g. "Press '1' for business, press '2' for personal").

In other embodiments, in response to the audio prompt (e.g. which may be a voice prompt or other audio prompt), the user input received can be human voice input provided by the user via, for example, microphone 120. A voice recognition module 322 coupled to line selection input module 326 is configured to process the human voice input and determine the line selection (and provide the determined line selection to line selection input module 326) from the human voice input. The voice input may identify any one of one or more line identifiers, such as a line number (e.g. '1', '2') or a line name (e.g. 'business', 'personal'), for example. Voice recognition module 322 may receive the human voice input from the user via microphone 120, an auxiliary I/O device or subsystem 112 or other appropriate input subsystem, device, or module. The voice prompt output by audio prompt module 320 may have provided an appropriate instruction to the user requesting a line identifier (e.g. "Say '1' for business, say '2' for personal", or "Say 'business' or 'personal'").

The functionality provided by voice recognition module 322 allows the user to respond verbally to an audio prompt to select a desired communication line. Allowing for voice input to be received at mobile device 100 may make it easier (e.g. less physical effort) for the user of mobile device 100 to select a communication line, in contrast to pressing keys or navigating menus. In addition, after initiating a call on mobile device 100 and when the user receives the audio prompt, speaker 118 of mobile device 100 may already be near the user's ear, and microphone 120 may already be near the user's mouth. Accordingly, it may be convenient for the user to select a communication line verbally. Action may also be taken without the need for the user to remove mobile device 100 from the user's ear.

It will be understood that some or all of the functionality of voice recognition module 322, line selection input module 326, or both may be provided or otherwise integrated with one or more of line selection module 318, phone application module 316, and a different module on mobile device 100. In example embodiments, the voice recognition module 322 and the line selection input module 326 is executed by processor 102 and resides on mobile device 100.

In variant embodiments, the user may be provided with two options: to either provide user input identifying a line selection by providing voice input, or by keyed input. The voice prompt output by audio prompt module 320 may have provided an appropriate instruction to the user (e.g. "Say or press '1' for business, say or press '2' for personal).

Persons skilled in the art will understand that the specific instructions provided as voice prompts as described herein are provided by way of example only, and may vary in variant implementations. The specific type of instructions to be employed may also be configurable by a user or an administrator.

After line selection input module 326 receives the line selection from the user input (e.g. using voice recognition module 322 in at least one embodiment), a corresponding selected communication line accessible at mobile device 100 is identified by a line selection module 318 from that user input. A communication module (e.g. in communication subsystem 104) may then be operated to place the call initiated by the user on the selected communication line, as identified by the line selection module 318.

In a variant embodiment, mobile device 100 may be configured such that audio prompt module 320 does not output an audio prompt if mobile device 100 has been configured (e.g. by a user or by an administrator) to automatically place calls initiated by the user on a default communication line. Where mobile device 100 has been configured to automatically place calls on a default communication line, the user need not be prompted for a line selection. In operation, in this embodiment, when a user makes a phone call, the line selection module 318 selects a default communication line. For example, the default communication line may be the communication line that was last used to place an outgoing call. As a further example, a contact for which data is stored in an address book managed by address book module 312 may be associated with a particular communication line (e.g. a business contact may be associated with a business line), and that communication line may be the default communication line that is to be used when an outgoing call is to be placed to that particular contact. As a further example, a contact for which data is stored in an address book managed by address book module 312 may be associated with a general category (e.g. family), and that category may have a communication line (e.g. personal) associated with it. That communication line may be the default communication line that is to be used when an outgoing call is to be placed to that particular contact. A "global" default communication line may also be defined for use when a given contact is not associated with a particular communication line.

In a variant embodiment, mobile device 100 may nevertheless be configured to output an audio prompt, receive user input identifying the line selection and identify a selected communication line on which the outgoing call is to be placed even if a default communication line may be defined. For example, the audio prompt may be a voice prompt that requests the user to verify that the default communication line should be used (e.g. "Say 'yes' if you want this call to be placed on your business line, say 'no' if you want this call to be placed on some other line", or "The last line used to call this number was your personal line. Do you want to use the same line for this call? Say 'yes' or 'no'"). Depending on the user's response, the default line may be used, or alternatively, a different line selection may be made.

Figure 5:
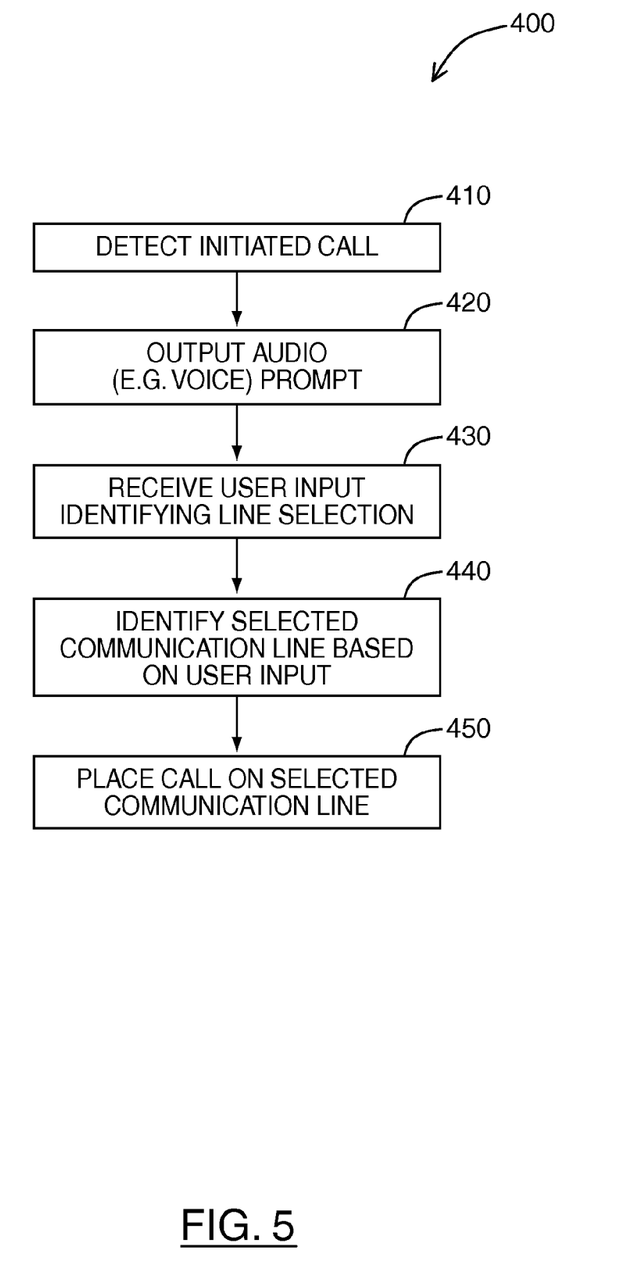
FIG. 5 is a flowchart illustrating acts of a method of placing a call from a mobile device on a selected communication line in accordance with at least one embodiment.

Referring now to FIG. 5, a flowchart illustrating acts of a method of placing a call from a mobile device on a selected communication line in accordance with at least one embodiment is shown generally as 400. Additional details of some of the features described below in respect of the acts of method 400 have been described earlier in the present specification.

In the example embodiments described herein, the acts of method 400 are performed at a mobile device (e.g. mobile device 100 of FIG. 1) by one or more application modules (e.g. phone application module 316, line selection module 318, audio prompt module 320, voice recognition module 322, call initiation detection module 324, line selection input module 326 of FIG. 4) that execute and reside on mobile device 100. The one or more application modules need not be implemented in a stand-alone application, and some or all of the functionality of one or more application modules may be implemented in different modules in variant implementations.

At 410, a call initiation detection module 324 of mobile device 100 detects when a call is initiated at mobile device 100 based on input received from the user via a user interface. For example, the user may initiate a call by pressing the send key on keyboard 116, or by selecting a "call" item from a menu. In a variant embodiment, the user may use voice activation commands to initiate the call.

At 420, an audio prompt module 320 of mobile device 100 outputs an audio prompt requesting a line selection after the initiation of a call is detected at 410. The audio prompt may be outputted over a speaker (e.g. 118 of FIG. 1), an earpiece or a headset, for example. The audio prompt can be any appropriate audio signal that the user will recognize as indicating that a line selection is required. The audio prompt may comprise one or more beeps or musical tones, for example. As previously noted, in accordance with at least one embodiment, the audio prompt may also be a voice prompt that requests a line identifier that identifies the line selection (e.g. a line number such as '1' or '2', or a line name such as 'business' or 'personal').

In some embodiments, the audio or voice prompt may be accompanied by a message displayed in a user interface provided by a display (e.g. display 110 of FIG. 1). The displayed message can repeat all or part of the voice or audio prompt and may provide other options (e.g. "Please say the name of the line you would like to use: 'business' or 'personal', OR press '1' to use the business line, or press '2' to use the personal line.")

At 430, a line selection input module 326 of mobile device 100 receives input from the user identifying the line selection in response to the audio prompt output at 420. In some embodiments, the user may provide input through keyboard 116. In at least one other embodiment, the user may provide voice input (i.e. verbally) by speaking into a microphone or similar input device (e.g. microphone 120 of FIG. 1). The user may provide the input by, for example, saying a line number (e.g. "1" or "2" or "line 1" or "line 2"), a line name (e.g. "business", "personal"), or some other line identifier that can be recognized by a voice recognition module 322 of mobile device 100.

At 440, a line selection module 318 of mobile device 100 identifies a selected communication line from the communication lines accessible at the mobile device, based on the user input received at 430. In embodiments wherein the user has entered keyed input (e.g. via keyboard 116), then the selected communication line is identified based on the key or keys depressed by the user. In embodiments wherein the user provides voice input, a voice recognition module 322 processes the voice input and determines the line selection from the voice input. The result of the determinations made by voice recognition module 322 may then be communicated to line selection module 318.

At 450, a communication module of mobile device 100 places the call on the selected communication line identified at 440.

As previously noted, in some variant embodiments, mobile device 100 may be configured to perform the acts described at 420, 430, and 440 only if mobile device 100 is not configured to automatically place the call initiated by the user (as detected at 410) on a default communication line. In other variant embodiments, the acts described at 420, 430, and 440 may be performed even if a default communication line may be defined, but the audio prompt (output at 420) may be a voice prompt that asks the user to confirm that the call should be completed on the defined default communication line (e.g. "This number is categorized as a business contact. Do you wish to use your business line for this call?").

A number of embodiments have been disclosed herein. However, it will be understood by persons skilled in the art that other variants and modifications may be made without departing from the scope of the invention as defined in the claims appended hereto.

The invention claimed is:

1. A method of placing a call from a mobile device on one of a plurality of communication lines accessible at the mobile device, the method comprising:
    configuring the mobile device to associate either one or more beeps or one or more musical tones with a request for a line selection;
    detecting when a call is initiated at the mobile device based on input received via a user interface of the mobile device;
    outputting the one or more beeps or one or more musical tones in combination with a visual prompt on a display to request a line selection after detecting that the call has been initiated at the mobile device;
    receiving user input identifying the line selection in response to the outputting;
    identifying a selected one of the plurality of communication lines accessible at the mobile device from the user input; and
    operating a communication module to place the call on the selected communication line.

2. The method of claim 1, wherein the one or more beeps or one or more musical tones is output using at least one of: an earpiece, a headset, and a speaker of the mobile device.

3. The method of claim 1, wherein the visual prompt requests a line identifier.

4. The method of claim 3, wherein the line identifier comprises at least one of a line number or a line name.

5. The method of claim 1, wherein the user input comprises voice input, and wherein the method further comprises processing the voice input and determining the line selection from the voice input.

6. The method of claim 1, wherein the user input is received as keyed input at the mobile device.

7. The method of claim 1, wherein the outputting, the receiving and the identifying are performed if the mobile device fails to be configured to automatically place the call using a default communication line selected from the plurality of communication lines.

8. A mobile device configured to place a call on one of a plurality of communication lines accessible at the mobile device, the mobile device comprising a processor, a memory, at least one input device and at least one output device, wherein the mobile device provides a user interface, and wherein the mobile device further comprises:
    a call initiation detection module configured to detect when a call is initiated at the mobile device based on input received via the user interface of the mobile device;
    an audio prompt module configured to output one or more beeps or one or more musical tones in combination with a visual prompt on a display to request a line selection after the call initiation detection module detects that the call has been initiated at the mobile device;
    a line selection input module configured to receive user input identifying the line selection;
    a line selection module configured to identify a selected one of the plurality of communication lines accessible at the mobile device from the user input; and
    a communication module configured to place the call on the selected communication line;
    wherein the mobile device is further adapted to permit user configuration in which the one or more beeps or one or more musical tones is associated with the request for a line selection.

9. The mobile device of claim 8, wherein the one or more beeps or one or more musical tones is output over the at least one output device; and wherein the at least one output device comprises at least one of an earpiece, a headset, and a speaker of the mobile device.

10. The mobile device of claim 8, wherein the visual prompt requests a line identifier.

11. The mobile device of claim 10, wherein the line identifier comprises at least one of a line number or a line name.

12. The mobile device of claim 8, wherein the user input comprises voice input, and wherein the mobile device comprises a voice recognition module coupled to the line selection module, wherein the voice recognition module is configured to process the voice input and to determine the line selection from the voice input.

13. The mobile device of claim 8, wherein the user input is received as keyed input at the mobile device.

14. The mobile device of claim 8, wherein the line selection module is configurable to place the call automatically on a default communication line, and wherein the audio prompt module withholds outputting the one or more beeps or one or more musical tones and the visual prompt if the line selection module is configured to place the call automatically on a default communication line.

15. A non-transitory computer-readable medium for storing instructions executable on a processor of a mobile device for performing acts of a method of placing a call from a mobile device on one of a plurality of communication lines accessible at the mobile device, the method comprising:
    configuring the mobile device to associate either one or more beeps or one or more musical tones with a request for a line selection;
    detecting when a call is initiated at the mobile device based on input received via a user interface of the mobile device;
    outputting the one or more beeps or one or more musical tones in combination with a visual prompt on a display to request a line selection after detecting that the call has been initiated at the mobile device;
    receiving user input identifying the line selection in response to the outputting;
    identifying a selected one of the plurality of communication lines accessible at the mobile device from the user input; and
    operating a communication module to place the call on the selected communication line.

* * * * *